United States Patent
Moisan et al.

(10) Patent No.: US 8,036,352 B2
(45) Date of Patent: Oct. 11, 2011

(54) METHOD AND SYSTEM FOR DETERMINING MIGRATION OF PORTED TELEPHONE NUMBERS BETWEEN SERVICE PROVIDERS

(75) Inventors: Kevin James Moisan, Castro Valley, CA (US); Michael Liu, San Ramon, CA (US); Wayne Robert Heinmiller, Elgin, IL (US); Frederick Michael Armanino, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 67 days.

(21) Appl. No.: 12/614,737

(22) Filed: Nov. 9, 2009

(65) Prior Publication Data

US 2010/0057812 A1 Mar. 4, 2010

Related U.S. Application Data

(63) Continuation of application No. 11/239,995, filed on Sep. 30, 2005, now Pat. No. 7,620,163.

(51) Int. Cl.
*H04M 15/00* (2006.01)

(52) U.S. Cl. ............... 379/112.01; 379/111; 379/112.07; 379/112.09; 379/133; 379/221.13

(58) Field of Classification Search .................. 379/111, 379/112.01, 112.03, 112.04, 112.05, 112.06, 379/112.07, 112.09, 133, 134, 139, 221.13, 379/221.14
See application file for complete search history.

(56) References Cited

U.S. PATENT DOCUMENTS

| | | | |
|---|---|---|---|
| 5,042,027 A | 8/1991 | Takase et al. | |
| 5,703,939 A * | 12/1997 | Bushnell | 379/112.05 |
| 6,137,806 A | 10/2000 | Martinez | |
| 6,154,534 A * | 11/2000 | Bredberg et al. | 379/221.13 |
| 6,240,293 B1 | 5/2001 | Koster | |
| 6,298,123 B1 | 10/2001 | Nolting et al. | |
| 6,298,352 B1 | 10/2001 | Kannan et al. | |
| 6,366,663 B1 | 4/2002 | Bauer et al. | |
| 6,625,273 B1 | 9/2003 | Ashdown et al. | |
| 6,628,622 B1 | 9/2003 | Bulick et al. | |
| 6,975,711 B2 | 12/2005 | Moisan et al. | |
| 2002/0176562 A1 * | 11/2002 | Hao | 379/221.13 |
| 2003/0190015 A1 | 10/2003 | McCulley et al. | |
| 2005/0152509 A1 | 7/2005 | Nelson et al. | |
| 2006/0023854 A1 | 2/2006 | Moisan et al. | |
| 2010/0261449 A1 * | 10/2010 | Mishkin | 455/405 |

FOREIGN PATENT DOCUMENTS

| EP | 07564428 A2 | 1/1997 |
|---|---|---|
| EP | 1 098 502 A2 * | 5/2001 |

* cited by examiner

*Primary Examiner* — Binh Tieu
(74) *Attorney, Agent, or Firm* — Brooks Kushman P.C.

(57) ABSTRACT

A method and system include obtaining at a first time a first image of a database having number portability records for each telephone number which has been ported between service providers. The first image is indicative of the LNP records in the database at the first time. At a second time a second image of the database is obtained. The second image is indicative of the records in the database at the second time. The first and second images are compared to determine migration of ported telephone numbers.

20 Claims, 2 Drawing Sheets

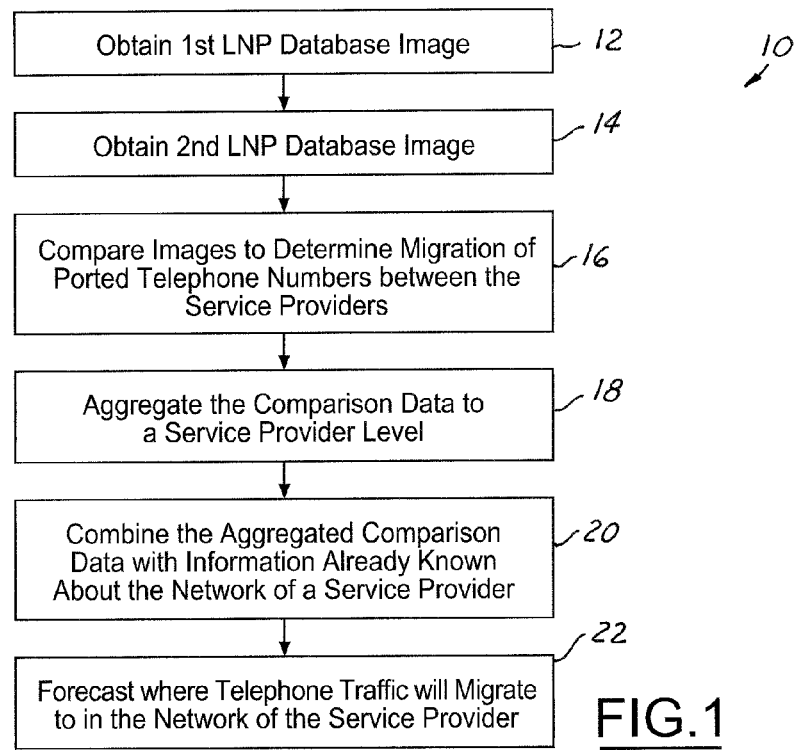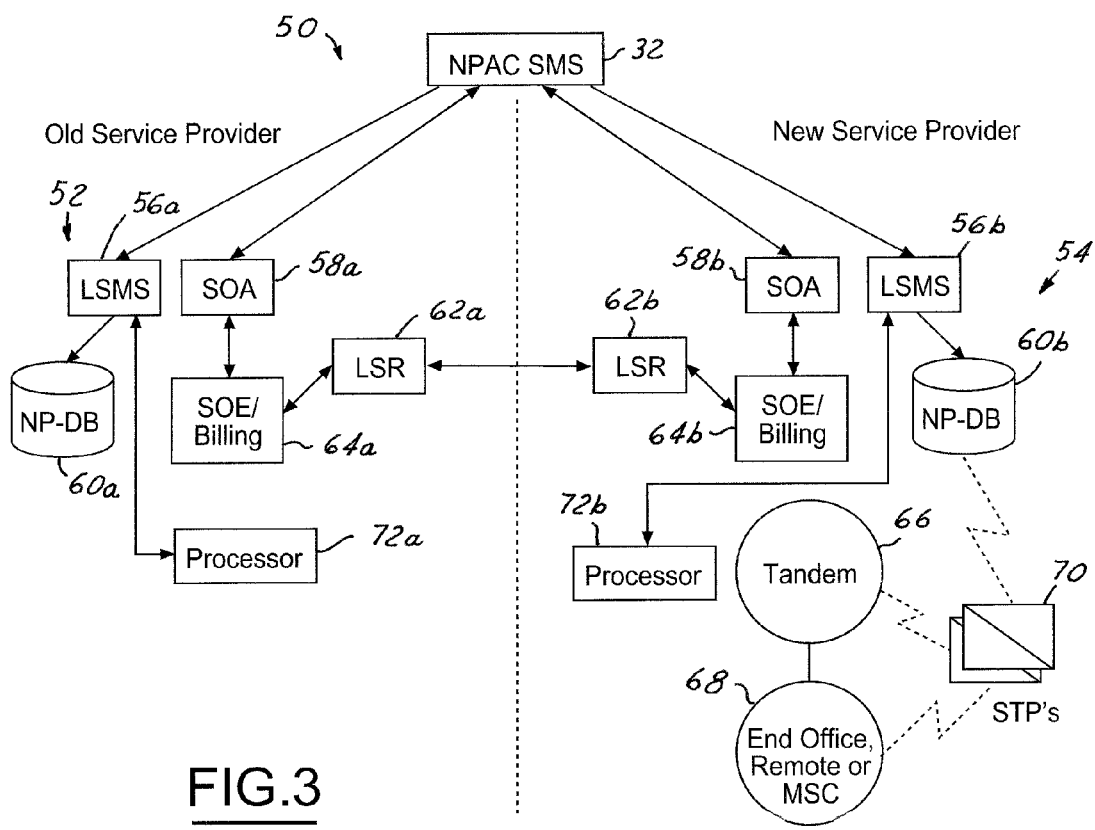

METHOD AND SYSTEM FOR DETERMINING MIGRATION OF PORTED TELEPHONE NUMBERS BETWEEN SERVICE PROVIDERS

CROSS-REFERENCE TO RELATED APPLICATIONS

This application is a continuation of U.S. application Ser. No. 11/239,995, filed Sep. 30, 2005, now U.S. Pat. No. 7,620, 163; which is a continuation of U.S. application Ser. No. 10/819,443, filed Apr. 7, 2004, now U.S. Pat. No. 6,975,711.

BACKGROUND OF THE DISCLOSURE

1. Field of the Disclosure

The present disclosure relates generally to methods and systems using local number portability (LNP) databases and, more particularly, to a method and system for forecasting telephony traffic trends using number portability records.

2. Background Art

Local number portability (LNP) allows wireless and landline telephone customers to keep their telephone numbers when they change residences and/or service providers. A LNP database stores a list of telephone numbers that have been switched or ported from one service provider to another service provider. For each ported telephone number, the LNP database also stores an associated location routing number (LRN). The networks of the service providers use the LRN to route a telephone call from a point of origination (such as from a telephone associated with the ported telephone number or from another party's telephone) to a point of destination (such as to the other one of the telephone associated with the ported telephone number or to the other party's telephone) over the public switched telephone network (PSTN).

Porting telephone numbers between service providers causes changes in the way that the networks of the service providers handle telephone calls associated with the ported telephone numbers. Generally, the network of a service provider handles more telephone calls if there is a net influx of ported telephone numbers to the service provider. As such, the service provider should ensure that its network has enough capacity and is properly connected to the networks of other service providers in order to handle the additional telephone traffic. Likewise, the network of a service provider handles less telephone calls if there is a net outflow of ported telephone numbers from the service provider. As such, this service provider should consider changing its network and reconfiguring how its network is connected to the networks of other service providers in view of the reduced amount of telephone traffic.

The networks of the other service providers not directly involved in the porting of telephone numbers between two service providers may also handle telephone calls associated with the ported telephone numbers differently after these telephone numbers have been ported between the two directly involved service providers. As such, these other service providers should consider changing their networks and reconfiguring how their networks connect with the networks of other service providers in view of the differently routed telephone traffic.

Presently, network engineers monitor service provider networks using broad measures such as minutes of use on trunk groups, blocking on trunk groups, and point-to-point telephone traffic flows through the networks. These metrics are compiled over long periods of time (for instance, several months) and therefore are indicative of what has previously happened in the networks. As such, these are lagging indicators of telephone traffic trends.

Thus, there exists a need for using LNP database images or snapshots obtained at periodic times to track ported telephone numbers between service providers and then use this data along with topology and interconnection data regarding the networks of the service providers in order to predict future telephone traffic on the service provider networks.

BRIEF DESCRIPTION OF THE DRAWINGS

The present disclosure is pointed out with particularity in the appended claims. However, other features of the present disclosure will become more apparent, and the present disclosure will be best understood by referring to the following detailed description in conjunction with the accompanying drawings in which:

FIG. 1 illustrates a flowchart describing the overall operation of a method in accordance with an embodiment of the present disclosure;

FIG. 3 illustrates a block diagram of old and new ported service provider networks in accordance with the present disclosure.

DETAILED DESCRIPTION OF THE PREFERRED EMBODIMENT(S)

Figure 2:
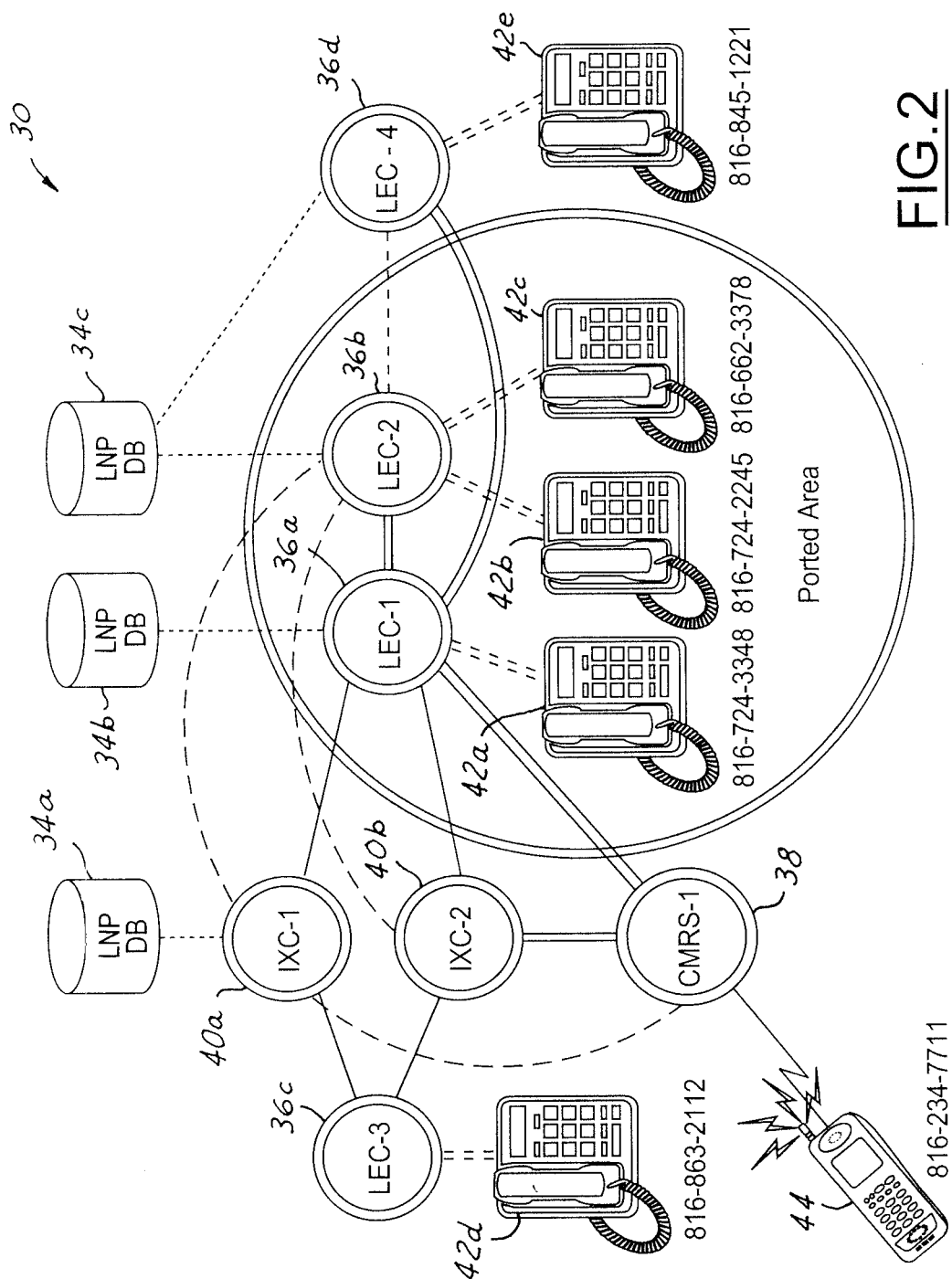
FIG. 2 illustrates a segment of the public switched telephone network (PSTN) in accordance with the present disclosure.

The present disclosure discloses an embodiment of a method which includes obtaining at a first time a first image of a database having local number portability (LNP) records for each telephone number which has been ported between service providers. The first image is indicative of the LNP records in the database at the first time. The method further includes obtaining at a second time a second image of the database, the second image being indicative of the LNP records in the database at the second time. The method further includes comparing the first and second images to determine migration of ported telephone numbers.

The present disclosure discloses an embodiment of a system having a switch and a processor. The switch is configured to query a database to obtain a first image of the database at a first time. The database has local number portability (LNP) records for each telephone number which has been ported between service providers. The first image is indicative of the LNP records in the database at the first time. The switch is further configured to query the database to obtain a second image of the database at a second time. The second image is indicative of the LNP records in the database at the second time. The processor is configured to compare the first and second images to determine migration of ported telephone numbers.

The present disclosure discloses an embodiment of a method which includes obtaining at a first time a first image of a database having number portability records for each wireless telephone number which has been ported between service providers. The first image is indicative of the records in the database at the first time. The method further includes obtaining at a second time a second image of the database. The second image being indicative of the records in the database at the second time. The method further includes comparing the first and second images to determine migration of ported wireless telephone numbers.

Referring now to FIG. 1, a flowchart describing the overall operation of a method 10 in accordance with an embodiment of the present disclosure is shown. In general, method 10 provides a service provider with the ability to forecast telephony traffic trends in the public switched telephone network (PSTN) using local number portability (LNP) databases. Method 10 includes periodically obtaining LNP database images or snapshots. The images are then compared with one another to determine the service providers (i.e., carriers) from which ported telephone numbers have migrated to and from over time. That is, the images are compared with one another to determine the service providers from which ported telephone numbers have migrated over a period of time, and to determine the service providers to which the ported telephone numbers have migrated over the period of time. The service providers then use this information in conjunction with information known about their networks in order to forecast where telephony traffic will migrate to in their networks as a result of telephone numbers having been ported between the service providers.

This network engineering capability provided by method 10 makes telephone traffic engineering more immediate than the use of lagging indicators. Accordingly, this network engineering capability assists in anticipating telephone traffic changes brought about with the advent of wireless number portability. The porting impact of wireless number portability is expected to be substantial and therefore markedly change telephone traffic patterns. Using ported telephone number changes in the LNP database in accordance with method 10 greatly shortens the time frame for determining telephone traffic shifts in the PSTN brought about with the advent of wireless number portability. In summary, method 10 uses telephone number movement between service providers to forecast associated telephone traffic trends, whereas other methods look after the fact how the actual telephone traffic has shifted.

As shown in FIG. 1, method 10 includes a service provider obtaining a first image or snapshot of a LNP database at a given first time as shown in block 12. The image or snapshot of the LNP database may be obtained from the LNP database itself or from a local service management system (LSMS). The LSMS has a copy of the LNP database and other related information. The LNP database stores a list of telephone numbers that have been ported between service providers. A telephone number ported to a service provider means that the user of the ported telephone number is a customer or subscriber of the service provider. As such, the service provider of which the telephone number has ported to becomes associated with the ported telephone number. That is, the customer of the telephone number becomes a customer of the service provider once the customer's telephone number has been ported to this service provider.

For each ported telephone number, the LNP database also stores an associated location routing number (LRN) and other signaling information. The service providers use the LRN and the signaling information in order to complete telephone calls over the PSTN involving the associated ported telephone number. In order to obtain the first image of the LNP database, a switch of the service provider sends a query to the LNP database itself for the first image at the first time. The first image of the LNP database provides information indicative of the ported telephone numbers at the first time. The service providers associated with the ported telephone numbers at the first time are determinable by using the associated LRNs. Alternatively, a processor of the service provider sends a query to the LSMS for a copy of the first image of the LNP database and the related information. The related information generally includes transaction histories of the ported telephone numbers along with the identities of the service providers involved with the porting during each transaction.

Method 10 then includes the service provider obtaining a second image or snapshot (as well as other subsequent images or snapshots) of the LNP database at a second subsequent time (and other subsequent times) as shown in block 14. The service provider obtains the second and subsequent images periodically at subsequent times by having its switch send queries to the LNP database. Alternately, the processor of the service provider sends queries to the LSMS. These subsequent images of the LNP database provide information indicative of the ported telephone numbers at the subsequent times. Again, the service providers associated with the ported telephone numbers at the subsequent times are determinable by using the associated LRNs (or determinable directly from the related information stored in the LSMS).

Method 10 then includes the service provider comparing the first and second images (as well as other subsequent images) to one another in order to determine migration of the ported telephone numbers between the service providers during the time period between the first and second times as shown in block 16. The comparison yields information regarding from and to which service providers the ported telephone numbers have migrated by the end of the associated time period. Method 10 then includes the service provider aggregating this comparison information to the service provider level as shown in block 18. The aggregated comparison information provides information indicative of which ported telephone numbers have migrated from the service provider during the time period, and information indicative of which ported telephone numbers have migrated to the service provider during the time period.

Method 10 then includes combining the aggregated comparison information with information already known about the network of the service provider as shown in block 20. In addition to information regarding the assigned capacity and configuration of the elements of the network of the service provider and other types of related network information, such known network information also includes information about how the network of the service provider connects with the networks of other service providers.

Based on the combined information generated in block 20, method 10 then forecasts where telephone traffic will migrate to in the network of the service provider as shown in block 22. The telephone traffic forecast is essentially based on the ported telephone number movement between the service providers from the first to the second time (as well as being based on the known network information). As such, the telephone traffic forecast will forecast where telephone traffic will migrate to in the network of the service provider after the second (and subsequent) time(s) as a result of the ported telephone numbers.

Referring now to FIG. 2, with continual reference to FIG. 1, a PSTN segment 30 for use with method 10 is shown. PSTN segment 30 includes LNP databases 34a, 34b, and 34c, which are associated with a plurality of respective service providers (i.e., carriers). The service providers generally include local exchange carriers (LECs), cellular carriers (CMRS), and inter-exchange carriers (IXCs). PSTN segment 30 includes service providers LEC-1 36a, LEC-2 36b, LEC-3 38c, and LEC-4 38d; service provider CMRS-1 38; and service providers IXC-1 40a and IXC-2 40b. As such, PSTN segment 30 is serviced by four service provider LECs (36a, 36b, 36c, and 38d), one service provider CMRS 38, and two service provider IXCs (40a and 40b). The service provider LECs 36 and CMRS 38 provide regional telephone services to their customers. The service provider IXC 40 operates with the service provider LECs 36 and CMRS 38 to provide long distance telephone services to their customers. The service providers LECs 36, CMRS 38, and IXCs 40 include switches for routing the telephone calls.

Some service providers are in communication with LNP databases 34 in order to provide LNP functionality. For instance, service provider LEC-1 36a is in communication with LNP database 34b; and service providers LEC-2 36b and LEC-4 36d are in communication with LNP database 34c. Service provider LEC-3 36c does not have communication with an LNP database and is unable by itself to support LNP. The service providers communicate in real time with LNP databases 34 to receive LRN information for routing telephone calls involving the ported telephone numbers over the PTSN.

The service providers provide telephone services to land line telephones and wireless phones of their customers. The customers of the service providers have their own associated telephone numbers. For example, the customer of telephone 42a (number 816-724-3348) is a customer of service provider LEC-1 36a; the customers of telephones 42b and 42c (numbers 816-724-2245 and 816-662-3378) are the customers of service provider LEC-2 36b; the customer of telephone 42d (number 507-863-2112) is a customer of service provider LEC-3 36c; and the customer of telephone 42e (number 816-845-1221) is a customer of service provider LEC-4 36d. Similarly, the customer of wireless phone 44 (number 816-234-7711) is a customer of service provider CMRS-1 38.

In PSTN segment 30, the service provider LECs 36 and the service provider CMRS 40 are assumed to be in a ported area. As customers port between service providers, the existing trunk arrangements can become insufficient to serve the rearranged traffic patterns generated by the ported customers. This results in blocked telephone calls or in telephone calls using higher cost and less efficient routes in the networks to get from the network of one service provider to the network of another service provider.

As an example of the rearranged traffic patterns when customers port between service providers, assume that customer of telephone 42b makes many telephone calls to the customer of telephone 42c. Both of these customers are served by the switches of service provider LEC-2 36b. As such, no other service provider sees the telephone traffic for the telephone calls between telephones 42b and 42c because such telephone traffic occurs entirely within service provider LEC-2 36b. Now assume that the customer of telephone 42b ports to service provider CMRS-1 38 and continues to make many telephone calls to telephone 42c. Now service provider CMRS-1 38, in addition to service provider LEC-2 36b, sees the telephone traffic between telephones 42b and 42c. Furthermore, there are no direct connections between service provider CMRS-1 38 and LEC-2 36b. As such, the telephone calls between telephones 42b and 42c are likely to tandem through a switch of service provider LEC-1 36a. Accordingly, the switches of service providers LEC-1 36a, LEC-2 36b, and CMRS-1 38 are impacted by the telephone traffic between telephones 42b and 42c as a result of the customer of telephone 42b porting from service provider LEC-2 36b to service provider CMRS-1 38.

In accordance with method 10, a switch of service provider LEC-1 36a accesses or queries LNP database 34b to obtain images of the LNP database which includes the LNP record portion that shows the customer of telephone 42b porting from service provider LEC-2 36b to service provider CMRS-1 38. Similarly, the service provider LEC-1 36a receives LNP record portions from the images of LNP database 34b of all the porting events that occur in its serving area.

By analyzing the LNP record portions in order to determine how customers are moving between the service providers, service provider LEC-1 36a is able to identify telephone traffic patterns and trends. Based on these patterns and trends, service provider LEC-1 36a is better prepared to manage its network as well as its network connections to the networks of the other service providers.

In conjunction with the information regarding how customers are moving between the service providers, service provider LEC-1 36a uses information known about its network to manage its network accordingly. Such known information includes information regarding where the network of service provider LEC-1 36a will route telephone calls. That is, the known information includes information of which elements of the network of service provider LEC-1 36a will be used to complete telephone calls. The known information also includes information of which elements of the network of service provider LEC-1 36a will be used to complete telephone calls if the corresponding telephone numbers have been ported.

Referring now to FIG. 3, with continual reference to FIGS. 1 and 2, a block diagram 50 of old and new service provider networks 52 and 54 in accordance with the method of the present disclosure is shown. Old and new service provider networks 52 and 54 are in communication with a number portability administration/service management system (NPAC SMS) 32. The old service provider is "old" in the sense that a customer has discontinued service with the old service provider. That is, the customer's telephone number has ported out from the old service provider to the new service provider. The new service provider is "new" in the sense that the customer has started service with the new service provider. That is, the customer's telephone number has been ported to the new service provider from the old service provider.

Old and new service provider networks 52 and 54 generally include the same elements for carrying out the LNP functionality and for entering and submitting service order changes to NPAC SMS 32. For instance, old service provider network 52 includes a local service management system (LSMS) 56a, a service order administration (SOA) 58a, a regional LNP database 60a, a local service request (LSR) 62a, and a service order entry (SOE)/billing system 64a. Likewise, new service provider network 54 includes a LSMS 56b, a SOA 58b, a regional LNP database 60b, a LSR 62b, and a SOE/billing system 64b.

Block diagram 50 illustrates the general flow for the LNP records and LNP record portions required in each network 52 and 54 in order to complete telephone calls involving ported telephone numbers. The old and new service providers both submit records regarding the customer to port to the neutral NPAC SMS 32. At the time the porting event occurs and the customer's service is moved from the old service provider to the new service provider, NPAC SMS 32 downloads a LNP record for the porting customer to LSMS 56a and LSMS 56b as well as to the LSMS of other service providers serving that area. The LNP record for a ported telephone number includes a history file of all transactions related to the ported telephone number including the LRN and the identity of the involved service providers. These other service providers are not directly involved in the porting as are the old or new service providers. LSMS 56a and LSMS 56b download a portion of the LNP record (i.e., the LNP record portion) to their respective LNP databases 60a and 60b. As indicated above, the LNP record portion includes the ported telephone number, the LRN for the ported telephone number, and other signaling information.

In order to complete a telephone call involving a ported telephone number, LNP databases 60 are consulted in real-time in order to obtain the corresponding LRN from the LNP databases. For example, network 54 of the new service provider includes a tandem switch 66 and an end office switch 68 which are both connected by signal transfer points (STPs) 70 to LNP database 60b. Either one or both of tandem and end office switches 66 and 68 consult LNP database 60b via STPs 70 in order to route telephone calls of the customer to network 54 of the new service provider. End office switch 68 is also operable to query LNP database 60b to obtain images of the LNP database in accordance with method 10.

Old and new service provider networks 52 and 54 each further include respective processors 72a and 72b. Processor 72a is in communication with LSMS 56a and processor 72b is in communication with LSMS 56b. Each processor 72a and 72b is operable to extract from the respective LSMS 56a and LSMS 56b copies of the respective LNP databases (60a, 60b) and the other related information. The other related information includes the identity of the service providers involved with ported telephone numbers. By extracting and analyzing this information transmitted from NPAC SMS 32 to the respective LSMS 56a and LSMS 56b in accordance with method 10, the old and new service providers identify patterns and trends of how customers are moving between the service providers. That is, processor 72a of the old service provider obtains images or snapshots of LSMS 56a (as opposed to obtaining images or snapshots of the LNP record portions stored in LNP database 60a) in accordance with method 10 in order to determine which telephone numbers have ported over time and to determine the identity of the involved service providers. In turn, the old service provider uses this information with information already known about network 52 in order to determine the impacts of those trends on network 52 as well as the impact of those trends on the service providers in general.

Similarly, processor 72b of the new service provider obtains images or snapshots of LSMS 56b (as opposed to obtaining images or snapshots of the LNP record portions stored in LNP database 60b) in accordance with method 10 in order to determine which telephone numbers have ported over time and to determine the identity of the involved service providers. With this information and information known about network 54, the new service provider determines the impacts of those trends on network 54 as well as the impact of those trends on the service providers in general.

Thus, it is apparent that there has been provided, in accordance with the present disclosure, a method and system for determining migration of ported telephone numbers between service providers that fully satisfy the objects, aims, and advantages set forth above. While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A method comprising:
   obtaining at a first time a first image of a database having local number portability (LNP) records for each telephone number which has been ported between service providers, the first image being indicative of the LNP records in the database at the first time;
   storing the first image in a memory;
   obtaining at a second time a second image of the database, the second image being indicative of the LNP records in the database at the second time;
   storing the second image in the memory; and
   comparing the first image and the second image to determine migration of ported telephone numbers.

2. The method of claim 1 further comprising:
   combining information indicative of the determined migration with known information about a network of a given service provider.

3. The method of claim 2 wherein:
   the known information includes information regarding how the network of the given service provider is connected to networks of other service providers.

4. The method of claim 1 wherein a network of a given service provider includes a switch, wherein:
   obtaining the first and second images includes the switch of the network of the given service provider querying the database for the first and second images.

5. The method of claim 1 wherein:
   each LNP record contains information regarding a corresponding ported telephone number and a location routing number (LRN) for the ported telephone number;
   the method further comprising determining the identity of service providers directly involved with the determined migration using the LRNs for the ported telephone numbers.

6. The method of claim 1 further comprising:
   obtaining at a third time a third image of the database, the third image being indicative of the LNP records in the database at the third time; and
   storing the third image in the memory;
   wherein comparing includes comparing the first, second, and third images to determine migration of ported telephone numbers.

7. The method of claim 1 further comprising:
   configuring a network of a given service provider based on the determined migration.

8. A system comprising:
   a switch configured to query a database to obtain a first image of the database at a first time, wherein the database has local number portability (LNP) records for each telephone number which has been ported between service providers, the first image being indicative of the LNP records in the database at the first time;
   the switch further configured to query the database to obtain a second image of the database at a second time, the second image being indicative of the LNP records in the database at the second time; and
   a processor configured to compare the first and second images to determine migration of ported telephone numbers.

9. The system of claim 8 further comprising:
   a local service management system (LSMS) containing information regarding identities of service providers directly involved in the porting of the ported telephone numbers, wherein the LSMS provides the service provider identity information corresponding to a ported telephone number to the database when the telephone number has been ported between service providers.

10. The system of claim 9 wherein:
    the processor is further configured to query the LSMS to obtain a third image of the database at a third time, the third image being indicative of the LNP records in the database at the third time;

the processor further configured to compare the first, second, and third images to determine migration of ported telephone numbers.

11. The system of claim 8 wherein:
each LNP record contains information regarding a corresponding ported telephone number and a location routing number (LRN) for the ported telephone number;
wherein the processor is further configured to determine the identity of the service providers directly involved with the determined migration using the LRNs for the ported telephone numbers.

12. A method comprising:
obtaining at a first time a first image of a database having number portability records for each wireless telephone number which has been ported between service providers, the first image being indicative of the records in the database at the first time;
storing the first image in a memory;
obtaining at a second time a second image of the database, the second image being indicative of the records in the database at the second time;
storing the second image in the memory; and
comparing the first image and the second image to determine migration of ported wireless telephone numbers.

13. The method of claim 12 wherein:
each record for a ported wireless telephone number contains information regarding the identities of the service providers involved in the porting of the ported wireless telephone number;
wherein comparing includes comparing the images to determine the identities of the service providers involved in the porting of the ported wireless telephone numbers.

14. The method of claim 12 further comprising:
combining information indicative of the determined migration with known information about a network of a given service provider.

15. The method of claim 14 wherein:
the known information includes information regarding how the network of the given service provider is connected to networks of other service providers.

16. The method of claim 12 wherein a network of a given service provider includes a processor, wherein:
obtaining the first and second images includes the processor of the network of the given service provider querying the database for the first and second images.

17. The method of claim 12 further comprising:
obtaining at a third time a third image of the database, the third image being indicative of the records in the database at the third time; and
storing the third image in the database;
wherein comparing includes comparing the first, second, and third images to determine migration of ported wireless telephone numbers.

18. The method of claim 12 further comprising:
configuring a network of a given service provider based on the determined migration.

19. The method of claim 12 wherein the database further includes number portability records for each landline telephone number which has been ported between service providers, wherein:
comparing includes comparing the first and second images to determine migration of ported wireless and landline telephone numbers.

20. The method of claim 19 further comprising:
configuring a network of a given service provider based on the determined migration.

* * * * *